United States Patent
Kamio

(10) Patent No.: US 11,247,645 B2
(45) Date of Patent: Feb. 15, 2022

(54) SHIFT RANGE SWITCHING DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 639 days.

(21) Appl. No.: 16/311,870

(22) PCT Filed: Jun. 6, 2017

(86) PCT No.: PCT/JP2017/020945
§ 371 (c)(1),
(2) Date: Dec. 20, 2018

(87) PCT Pub. No.: WO2017/221689
PCT Pub. Date: Dec. 28, 2017

(65) Prior Publication Data
US 2019/0202417 A1 Jul. 4, 2019

(30) Foreign Application Priority Data
Jun. 24, 2016 (JP) .............................. JP2016-125342

(51) Int. Cl.
*B60T 1/06* (2006.01)
*F16H 61/32* (2006.01)
*H02P 23/00* (2016.01)
*B60T 1/00* (2006.01)

(52) U.S. Cl.
CPC .............. *B60T 1/062* (2013.01); *B60T 1/005* (2013.01); *B60T 1/06* (2013.01); *F16H 61/32* (2013.01); *H02P 23/00* (2013.01); *H02P 23/0004* (2013.01)

(58) Field of Classification Search
CPC ...... F16H 63/3466; F16H 63/38; F16H 61/32; F16H 2061/243; F16H 2061/247; F16H 2061/326; B60T 1/005; B60T 1/0062; B60T 1/06; H02P 23/00; H02P 23/0004
See application file for complete search history.

(56) References Cited

U.S. PATENT DOCUMENTS

| | | |
|---|---|---|
| 2005/0174084 A1 | 8/2005 | Nakai et al. |
| 2006/0103339 A1 | 5/2006 | Yamada et al. |
| 2009/0091284 A1 | 4/2009 | Isobe et al. |
| 2012/0119689 A1* | 5/2012 | Yamada .................. H02P 23/18 318/630 |
| 2016/0298761 A1 | 10/2016 | Noto et al. |

* cited by examiner

*Primary Examiner* — Ernesto A Suarez
*Assistant Examiner* — Lori Wu
(74) *Attorney, Agent, or Firm* — Nixon & Vanderhye P.C.

(57) ABSTRACT

An output shaft receives transmission of a driving force of a motor. A valley forming member has valley portions correspondingly to shift ranges and rotates integrally with the output shaft. An engaging member is biased with a biasing member in a direction to be fitted to a valley portion and is configured to be fitted to a target valley portion, which is a valley portion corresponding to a target shift range. The motor control unit performs a control to drive the motor. The motor shaft, which is a rotary shaft of the motor, and the output shaft have a play therebetween. The motor control unit determines a motor target position to locate the engaging member at a position shifted by a predetermined amount before the center of the target valley portion in the driving direction.

5 Claims, 12 Drawing Sheets

SHIFT RANGE SWITCHING DEVICE

CROSS REFERENCE TO RELATED APPLICATION

This application is the U.S. national phase of International Application No. PCT/JP2017/020945 filed on Jun. 6, 2017 which designated the U.S. and claims the benefit of priority from Japanese Patent Application No. 2016-125342 filed on Jun. 24, 2016. The entire contents of each of which are hereby incorporated by reference.

TECHNICAL FIELD

The present disclosure relates to a shift range switching device.

BACKGROUND ART

Conventionally, a shift range switching device, which switches a shift range by controlling a motor corresponding to a shift range switching request from a driver, is known. For example, Patent Literature 1 employs a switched reluctance motor as a driving source of a shift range switching mechanism. Hereinafter, the switched reluctance motor may be referred to as an SR motor.

PRIOR TECHNICAL LITERATURE

Patent Literature

PATENT LITERATURE JP 4385768 B2

SUMMARY OF INVENTION

In Patent Document 1, an engaging portion, which is provided at a tip of a detent spring, is fitted into a valley portion of a target range of a detent lever, thereby to hold a rotational angle of a detent lever at a target range. In Patent Document 1, an SR motor, which does not employ a permanent magnet, is used as a drive source of the shift range switching mechanism. In this structure, no cogging torque is generated, and therefore, when the motor is de-energized, the engaging portion is held at the center of the valley portion by application of resilience of the detent spring. To the contrary, for example, in a case where a motor, which is configured to generate cogging torque, is employed instead of the SR motor, even when the motor is de-energized, the engaging portion may be held at a position different from the center of the valley due to influence of the cogging torque. It is an object of the present disclosure to provide a shift range switching device configured to switch a shift range appropriately.

A shift range switching device according to the present disclosure includes a motor, an output shaft, a valley forming member, an engaging member, and a motor control unit. The output shaft receives transmission of a driving force of the motor. A valley forming member has valley portions correspondingly to shift ranges and configured to rotate integrally with the output shaft. An engaging member is biased with a biasing member in a direction to be fitted to the valley portion and is configured to be fitted to a target valley portion, which is the valley portion corresponding to the target shift range. The motor control device controls driving of the motor. A motor shaft, which is a rotary shaft of the motor, and the output shaft have a play Dg therebetween.

According to a first aspect, the motor control unit is configured to determine the motor target position to locate the engaging member at a position shifted before a center of the target valley portion in the driving direction by a predetermined amount. The motor control unit is configured, after the motor stops within a range of a control error including a motor target position, to perform a reverse control to drive the motor in a direction, which is opposite to a rotational direction before the motor stops. In this way, even when a motor such as a DC motor, which generates a cogging torque, is employed as the motor, the engaging member is enabled to be fitted to the center of the target valley portion by resilience of the biasing member. Therefore, the configuration enables to appropriately switch the shift range.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Hereinafter, a shift range switching device will be described with reference to the drawings. Hereinafter, in multiple embodiments, a substantially equivalent configuration will be denoted by an identical reference, and explanation thereof will be omitted.

First Embodiment

Figure 1:
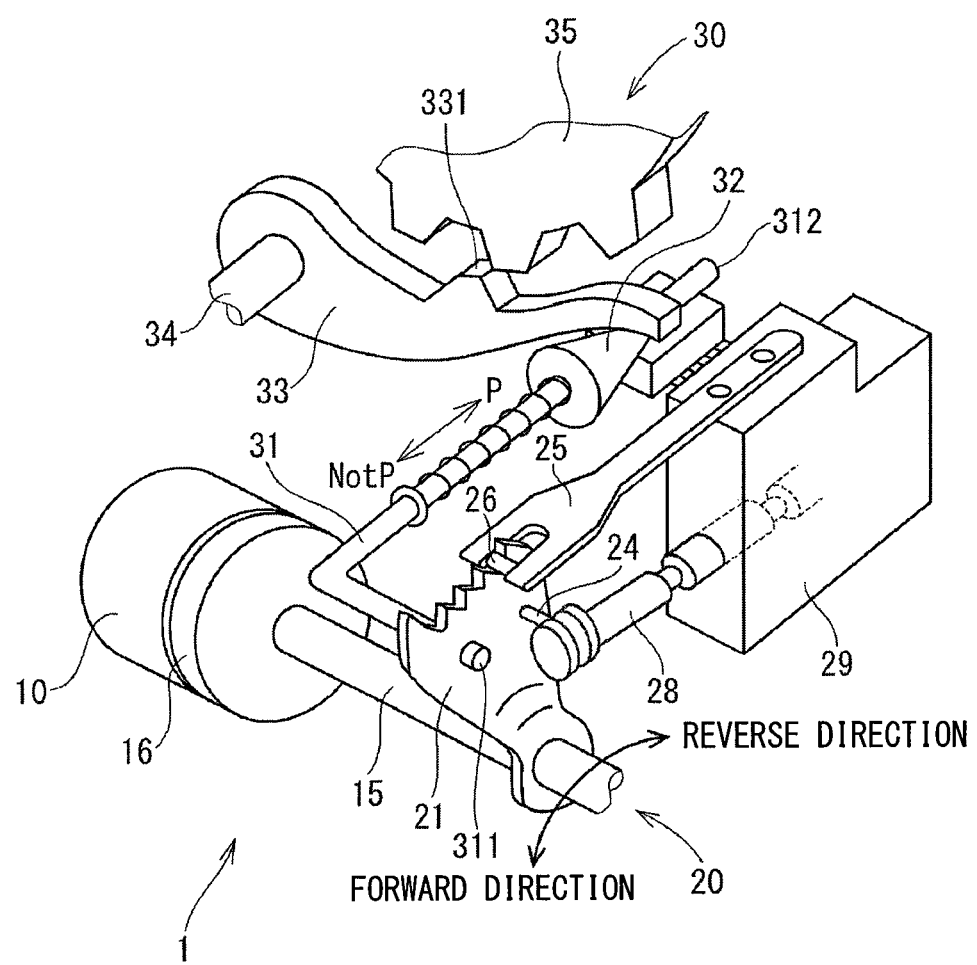
FIG. 1 is a perspective view showing a shift-by-wire system according to a first embodiment.
Figure 2:
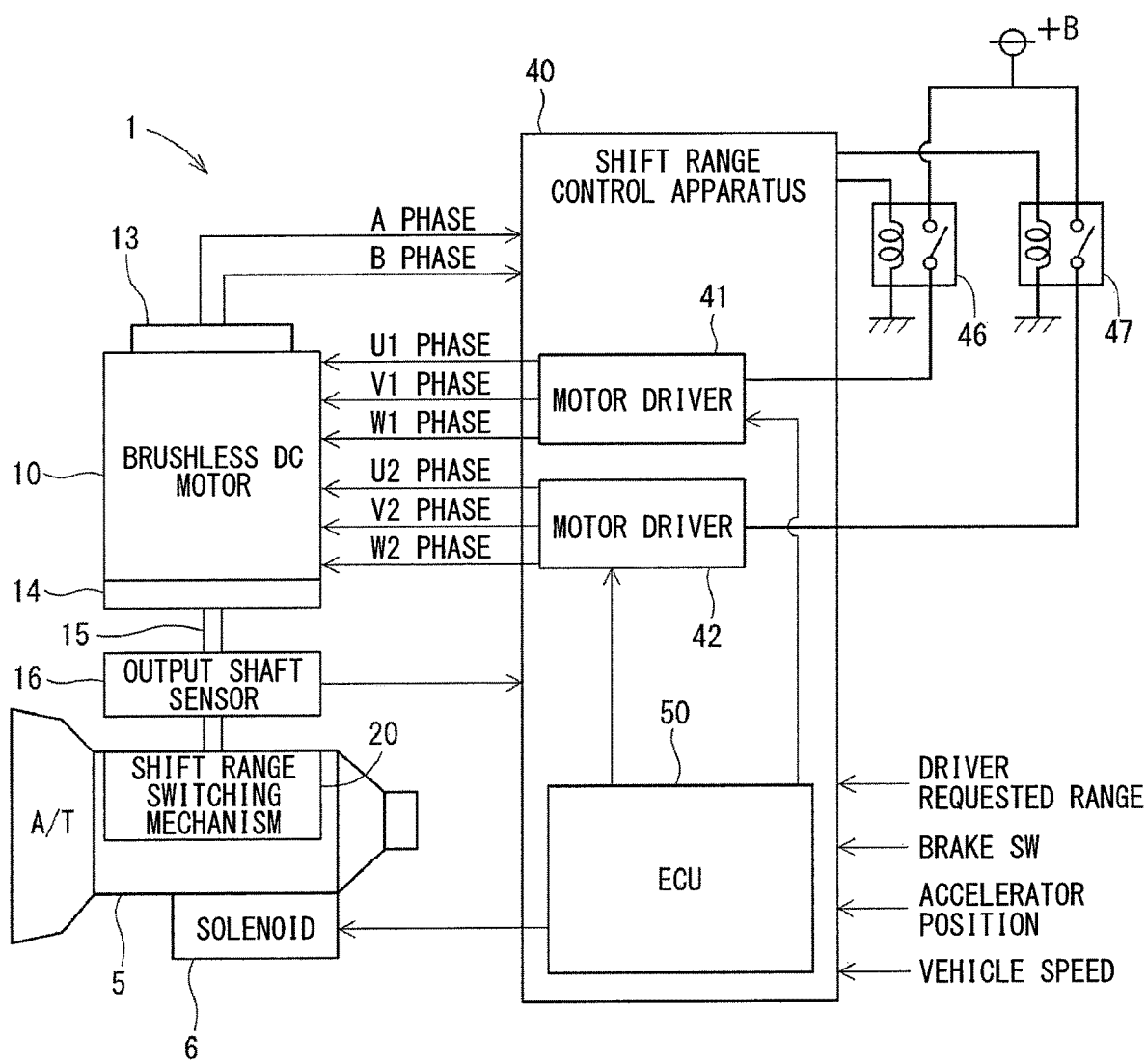
FIG. 2 is a diagram showing a schematic configuration of a shift-by-wire system according to the first embodiment.

A first embodiment will be described with reference to FIGS. 1 to 8. As shown in FIGS. 1 and 2, a shift-by-wire system 1 as a shift range switching device includes a motor 10, a shift range switching mechanism 20, a parking lock mechanism 30, a shift range control apparatus 40, and the like.

Figure 3:
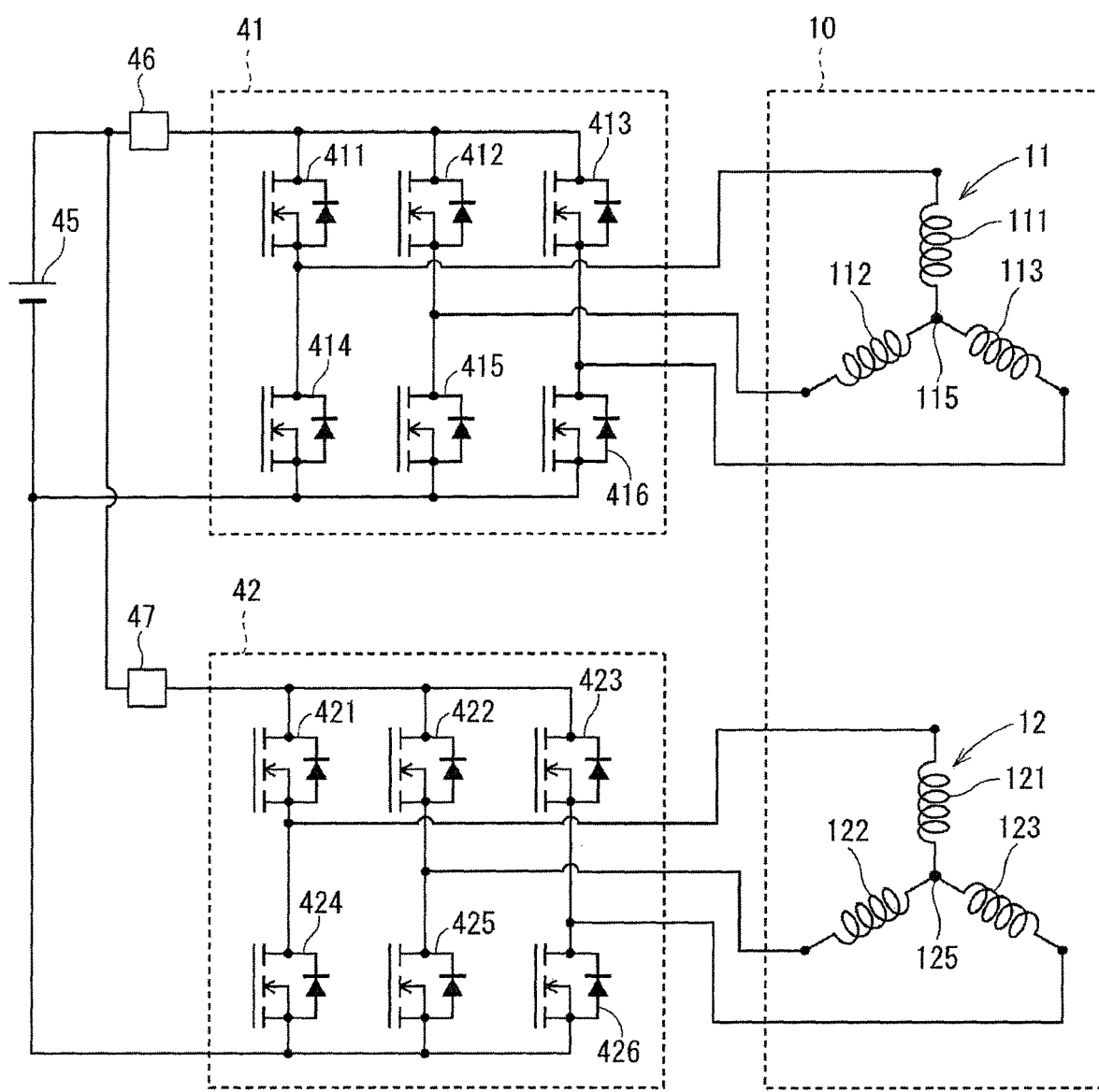
FIG. 3 is a circuit diagram showing a motor and a motor driver according to the first embodiment.

The motor 10 is supplied with electric power from a battery 45 (see FIG. 3), which is carried in a vehicle (not shown), to rotate thereby to function as a driving source of the shift range switching mechanism 20. The motor 10 is configured to perform a feedback control to change an amount of current. The motor 10 is configured to manipulate a command for each phase. The motor 10 of the embodiment is a permanent magnet type DC brushless motor. As shown in FIG. 3, the motor 10 includes two sets of windings 11 and 12. A first winding set 11 includes a U1 coil 111, a V1 coil 112, and a W1 coil 113. A second winding set 12 includes a U2 coil 121, a V2 coil 122, and a W2 coil 123.

As shown in FIG. 2, an encoder 13 detects a rotary position of a rotor (not shown) of the motor 10. The encoder 13 is, for example, a magnetic rotary encoder including a magnet, which rotates integrally with a rotor, a Hall IC, which detects magnetism, and the like. The encoder 13 outputs an A-phase pulse signal and a B-phase pulse signal at respective predetermined angles in synchronization with rotation of the rotor. A speed reducer 14 is provided between a motor shaft 105 (see FIG. 7 and the like), which is a rotary shaft of the motor 10, and an output shaft 15. The speed reducer 14 decelerates rotation of the motor 10 and outputs the decelerated rotation to the output shaft 15. In this way, the rotation of the motor 10 is transmitted to the shift range switching mechanism 20. An output shaft sensor 16 is provided to the output shaft 15 for detecting an angle of the output shaft 15. The output shaft sensor 16 is, for example, a potentiometer.

As shown in FIG. 1, the shift range switching mechanism 20 includes a detent plate 21 as a valley forming member, a detent spring 25 as an biasing member, and the like. The shift range switching mechanism 20 transmits a rotational driving force, which is outputted from the speed reducer 14, to a manual valve 28 and the parking lock mechanism 30. The detent plate 21 includes a pin 24 protruding in parallel with the output shaft 15. The pin 24 is connected to the manual valve 28. As the detent plate 21 is driven by the motor 10, the manual valve 28 moves back and forth in the axial direction. That is, the shift range switching mechanism 20 converts the rotary motion of the motor 10 into a linear motion and transmits the linear motion to the manual valve 28. The manual valve 28 is provided to a valve body 29. The manual valve 28 moves back and forth in the axial direction to switch hydraulic pressure supply paths, which are lead to a hydraulic clutch (not shown), thereby to switch an engagement state of the hydraulic clutch. In this way, the shift range is switched.

Figure 5:
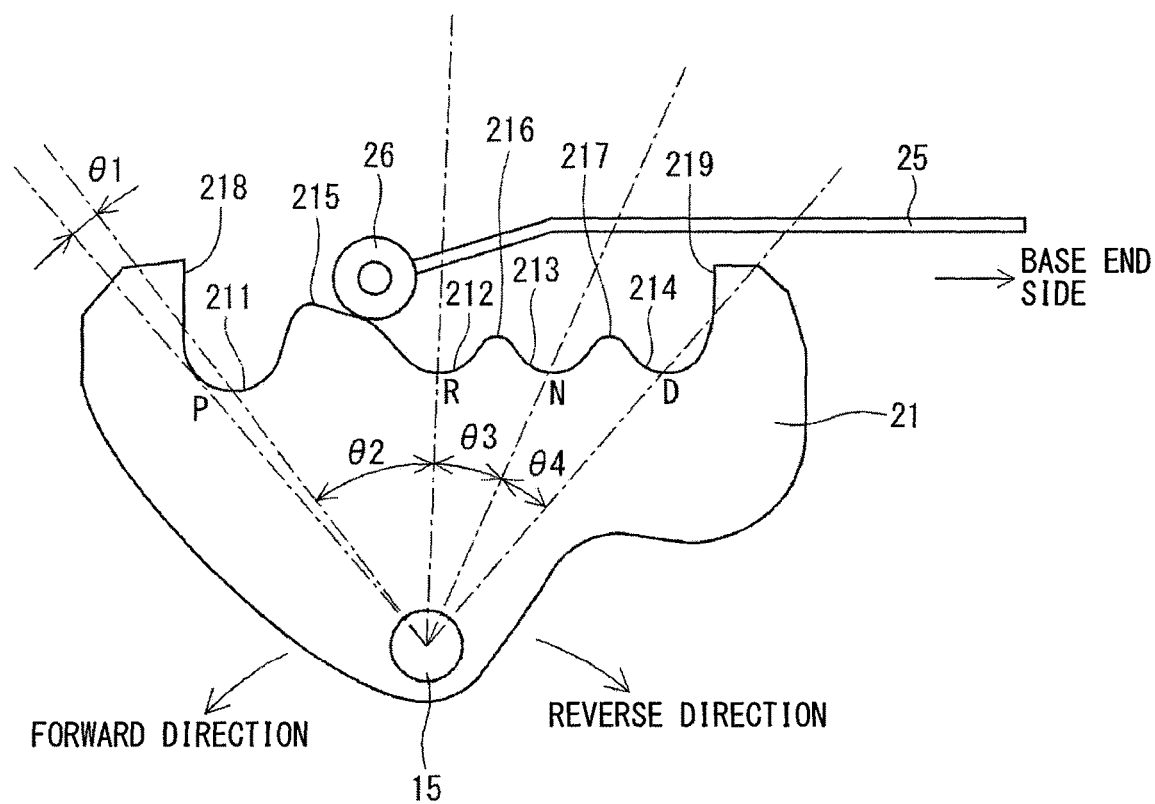
FIG. 5 is a plan view showing a detent plate according to the first embodiment.

As shown in FIG. 5, four valley portions 211 to 214 are formed on the side of the detent plate 21 closer to the detent spring 25. The valley portions 211 to 214 are to retain the manual valve 28 at positions corresponding to the respective shift ranges. The detent spring 25 is an elastically deformable plate-like member provided with a detent roller 26 at a tip end. The detent roller 26 is an engaging member. The detent roller 26 fits into one of the valley portions 211 to 214. The detent spring 25 biases the detent roller 26 toward a rotational center of the detent plate 21. When a rotational force equal to or larger than a predetermined level is applied to the detent plate 21, the detent spring 25 is deformed resiliently to enable the detent roller 26 to move among the valley portions 211 to 214. The detent roller 26 fits into one of the valley portions 211 to 214 thereby to restrict movement of the detent plate 21. In this way, the axial position of the manual valve 28 and the state of the parking lock mechanism 30 are adjusted, fsand the shift range of the automatic transmission 5 is fixed.

Details of the detent plate 21 are shown in FIG. 5. As shown in FIG. 5, the valley portions 211 to 214 correspond to P range, R range, N range, and D range, respectively, from one side. A ridge portion 215 is formed between the valley portion 211 and the valley portion 212. A ridge portion 216 is formed between the valley portion 212 and the valley portion 213. A ridge portion 217 is formed between the valley portion 213 and the valley portion 214.

A wall portion 218 is formed on a side of the valley portion 211 opposite to the ridge portion 215. The valley portion 211 corresponds to the P range. A wall portion 219 is formed on a side of the valley portion 214 opposite to the ridge portion 216. The valley portion 214 corresponds to the P range. The wall portions 218 and 219 are formed substantially in parallel with each other and are higher than the ridge portions 215 to 217. Therefore, even when the detent plate 21 rotates in a reverse direction in a state where the detent roller 26 is in the valley portion 211, the present configuration regulates movement of the detent roller 26 to restrict the detent roller 26 from moving beyond the wall portion 218. In addition, even when the detent plate 21 rotates in a forward direction in a state where the detent roller 26 is in the valley portion 214, the present configuration regulates movement of the detent roller 26 to restrict the detent roller 26 from moving beyond the wall portion 219.

Referring back to FIG. 1, the parking lock mechanism 30 includes a parking rod 31, a conical member 32, a parking lock pawl 33, a shaft part 34, and a parking gear 35. The parking rod 31 is generally in an L-shape. The parking rod 31 is fixed to the detent plate 21 on the side of one end 311. The conical member 32 is provided to the other end 312 of the parking rod 31. The conical member 32 is formed to reduce in diameter toward the other end 312. When the detent plate 21 pivots in the reverse direction, the conical member 32 moves in the direction shown by the arrow P.

The parking lock pawl 33 is configured to abut on a conical surface of the conical member 32 and to pivot about the shaft part 34. the parking lock pawl 33 has a protrusion 331 on the side of the parking gear 35. The protrusion 331 is configured to mesh with the parking gear 35. When the detent plate 21 rotates in the reverse direction to move the conical member 32 in the direction shown by the arrow P, the parking lock pawl 33 is raised to mesh the protrusion 331 with the parking gear 35. To the contrary, when the detent plate 21 rotates in the forward direction to move the conical member 32 in the direction sown by the arrow Not P, the protrusion 331 is disengaged from the parking gear 35.

The parking gear 35 is provided to an axle (not shown) and is enabled to mesh with the protrusion 331 of the parking lock pawl 33. When the parking gear 35 meshes with the protrusion 331, rotation of the axle is restricted. When the shift range is one of the ranges (Not P range) other than the P range, the parking gear 35 is not locked by the parking lock pawl 33. Therefore, the parking lock mechanism 30 does not regulate rotation of the axle. When the shift range is the P range, the parking gear 35 is locked by the parking lock pawl 33 to regulate rotation of the axle.

As shown in FIGS. 2 and 3, the shift range control apparatus 40 includes motor drivers 41 and 42, an ECU 50, and the like. The ECU 50 is a motor control unit. The motor driver 41 is a three phase inverter configured to switch energization of the first winding set 11 and includes switching elements 411 to 416 which are bridge-connected with each other. The switching elements 411 and 414 are paired and belong to U-phase. The switching elements 411 and 414 have a connection point therebetween, and the connection point is connected with one end of the U1 coil 111. The switching elements 412 and 415 are paired and belong to V-phase. The switching elements 412 and 415 have a connection point therebetween, and the connection point is connected with one end of the V1 coil 112. The switching elements 413 and 416 are paired and belong to W-phase. The switching elements 413 and 416 have a connection point therebetween, and the connection point is connected with one end of the W1 coil 113. The other ends of the coils 111 to 113 are connected to each other at a connected portion 115.

The motor driver 42 is a three phase inverter configured to switch energization of the second winding set 12 and includes switching elements 421 to 426 which are bridge-connected with each other. The switching elements 421 and 424 are paired and belong to U-phase. The switching elements 421 and 424 have a connection point therebetween, and the connection point is connected with one end of the U2 coil 121. The switching elements 422 and 425 are paired and belong to V-phase. The switching elements 422 and 425 have a connection point therebetween, and the connection point is connected with one end of the V2 coil 122. The switching elements 423 and 426 are paired and belong to W-phase. The switching elements 423 and 426 have a connection point therebetween, and the connection point is connected with one end of the W2 coil 123. The other ends of the coils 121 to 123 are connected at a connection portion 125. While the switching elements 411 to 416 and 421 to 426 according to the embodiment are MOSFETs, other devices such as IGBTs may also be employed.

A motor relay 46 is provided between the motor driver 41 and the battery 45. A motor relay 47 is provided between the motor driver 42 and the battery 45. When a starter switch, such as an ignition switch or the like, is turned on, the motor relays 46 and 47 are energized to supply electric power to the motor 10. When the starter switch is turned off, the motor relays 46 and 47 are de-energized to shut off electric power supply to the motor 10.

The ECU 50 controls on-off operation of the switching elements 411 to 416 and 421 to 426 to control the drive operation of the motor 10. The ECU 50 performs a control to drive a transmission hydraulic control solenoid 6 based on a vehicle speed, an accelerator position, a shift range requested by a driver, and the like. The transmission hydraulic control solenoid 6 is controlled to manipulate a shift stage. The number of the shift hydraulic pressure control solenoids 6 is determined according to the shift stage or the like. According to the present embodiment, a singular ECU 50 performs the control to drive the motor 10 and the solenoid 6. It is noted that, the ECU may be divided into a motor ECU, which is for motor control to control the motor 10, and an AT-ECU, which is for solenoid control. Hereinafter, a drive control of the motor 10 will be mainly described.

Figure 4:
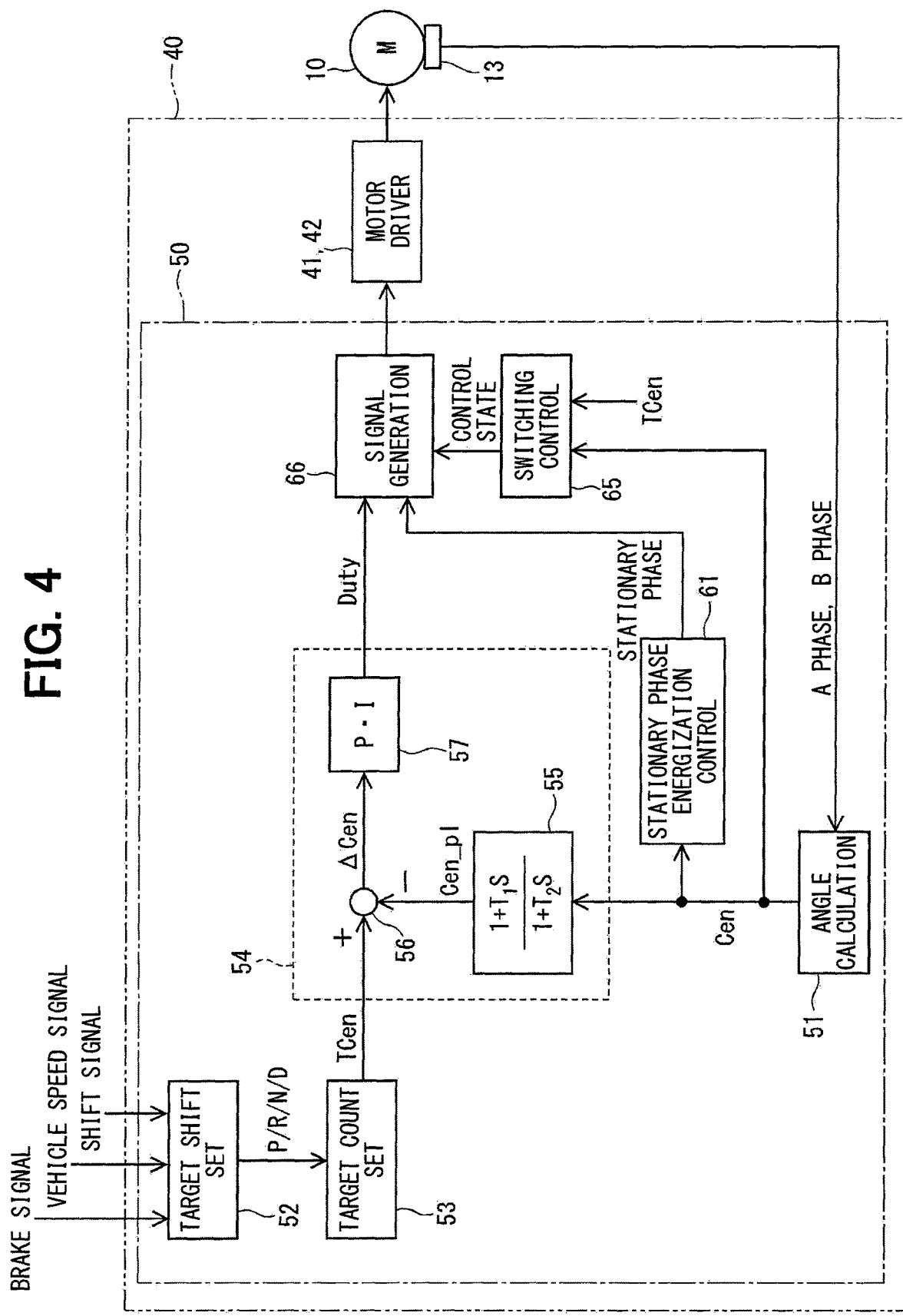
FIG. 4 is a block diagram showing an ECU according to the first embodiment.

As shown in FIG. 4, the ECU 50 includes an angle calculation unit 51, a target shift setting unit 52, a target count setting unit 53, a feedback control unit 54, a stationary phase energization control unit 61, a switching control unit 65, a signal generation unit 66, and the like. The ECU 50 is configured mainly with a microcomputer and the like. Each process executed by the ECU 50 may be software processing or may be hardware processing. The software processing may be implemented by causing a CPU to execute a program. The program may be stored beforehand in a material memory device such as a ROM, that is, in a readable non-transitory tangible storage medium. The hardware processing may be implemented by a special purpose electronic circuit.

The angle calculation unit 51 calculates an actual count value Cen, which is a count value of the encoder 13, based on an A-phase pulse and a B-phase pulse outputted from the encoder 13. The actual count value Cen is a value corresponding to an actual mechanical angle and an actual electrical angle of the motor 10. According to the present embodiment, the actual count value Cen is referred to as an actual angle.

As described above, the speed reducer 14 is provided between the motor shaft 105 and the output shaft 15. Therefore, when the motor shaft 105 rotates within a play between gears of the speed reducer 14 while the starter switch is turned off, a relative position between the motor shaft 105 and the output shaft 15 when the starter switch is turned off may deviate from the relative position when the starter switch is turned on. Therefore, the angle calculation unit 51 performs initial learning and calculates a correction value Cx when the starter switch is turned on. The initial learning equalizes the count value of the encoder 13 and the position of the output shaft 15. The initial learning is implemented by performing a wall butting control to rotate the motor 10 in both directions to abut the motor shaft 105 to walls of a gear, which is meshed with the motor shaft 105, on both sides. Hereinafter, the actual count value Cen is a value after being corrected with the correction value Cx.

The target shift setting unit 52 acquires a brake signal, which is outputted from a brake sensor (not shown), a vehicle speed signal, which is outputted from the vehicle speed sensor, and a shift signal, which corresponds to a position of a shift lever operated by the driver, and sets the target shift range. The target count setting unit 53 sets the target count value TCen of the motor 10 according to the target shift range. Details of the setting of the target count value TCen will be described later.

The feedback control unit 54 includes a phase advance filter 55, a subtractor 56, and a controller 57 and performs a position feedback control. The phase advance filter 55 performs a phase advance compensation to advance a phase of the actual count value Cen and calculates a phase advance value Cen_pl. The concept of actual angle encompasses the phase advance value Cen_pl which has been processed by executing the phase advance filter process. The subtracter 56 calculates a deviation ΔCen between the target count value TCen and the phase advance value Cen_pl.

The controller 57 calculates a duty to perform a PI control or the like to cause the phase advance value Cen_pl to coincide with the target count value TCen thereby to reduce the deviation ΔCen to zero. The position feedback control may perform a PWM control or the like to manipulate the duty thereby to modify a current flowing in the coils 111 to 113 and 121 to 123 and to modify a torque.

According to the present embodiment, 120° energization is performed in a rectangular wave control to drive the motor 10. In the rectangular wave control with the 120° energization, a switching element on the high voltage side at the first phase and a switching element on the low voltage side at the second phase are turned on. The combination of the first phase and the second phase is altered at electric angle of 60° thereby to switch the energization phase. In this way, the winding sets 11 and 12 are caused to generate a rotational magnetic field thereby to rotate the motor 10. According to the present embodiment, a rotational direction of the motor 10 when the output shaft 15 rotates in the forward direction is regarded as a forward direction.

The stationary phase energization control unit 61 performs a stationary phase energization control. The stationary phase control energization control is to stop rotation of the motor 10. The stationary phase control energization control is to select the stationary phase corresponding to the electric angle and to control the switching elements 411 to 416 and 421 to 426 to cause a current to flow in a predetermined direction of the selected stationary phase. In this way, an excitation phase is fixed. When the excitation phase is fixed, the motor 10 stops at a predetermined electric angle corresponding to the excitation phase. The stationary phase energization control unit 61 selects the stationary phase and the energization phase based on the actual count value Cen to stop the motor 10 at the electric angle that is the closest from the present rotor position.

The stationary phase energization control is performed when difference between the actual count value Cen and the target count value TCen becomes less than or equal to an angle determination threshold value ENth. That is, the actual count value Cen is considered to substantially coincide with the target count value TCen when the stationary phase energization control is performed. Therefore, the present configuration enables to stop the motor 10 at a position which substantially coincides with the target count value TCen by stopping the motor 10 at the electric angle closest to the present rotor position. Strictly, the electric angle, which corresponds to the target count value TCen, and the electric angle, at which the stationary phase energization control stops the motor 10, therebetween causes a deviation, which corresponds to a resolution of the motor, at most. However, a deviation in the stop position of the output shaft 15 is small when a reduction ratio of the speed reducer 14 is large, and therefore, it is negligible.

The switching control unit 65 switches a control state of the motor 10. Specifically, according to the present embodiment, the switching control unit 65 switches between a positional feedback control, which is based on the target count value TCen and the actual count value Cen, and a stationary phase energization control. The switching control unit 65 switches the control state of the motor 10 to the positional feedback control when the target shift range changes. The switching control unit 65 switches to the stationary phase energization control when an absolute value of a difference between the target count value TCen and the actual count value Cen is less than or equal to the angle determination threshold value ENth. The switching control unit 65 continues the stationary phase energization control until an energization duration Ta lapses after the switching to the stationary phase energization control. The switching control unit 65 switches to an energization off control after the energization duration Ta lapses. In the energization off control, all the switching elements 411 to 416 and 421 to 426 are turned off. According to the present embodiment, the absolute value of the difference between the target count value TCen and the actual count value Cen corresponds to a difference value between the target angle and the actual angle.

The signal generating unit 66 generates a driving signal to switch on and off the switching elements 411 to 416 and 421 to 426 according to the control state switched by the switching control unit 65 and outputs the driving signal to the motor drivers 41, 42. In this way, driving of the motor is controlled.

Figure 6:
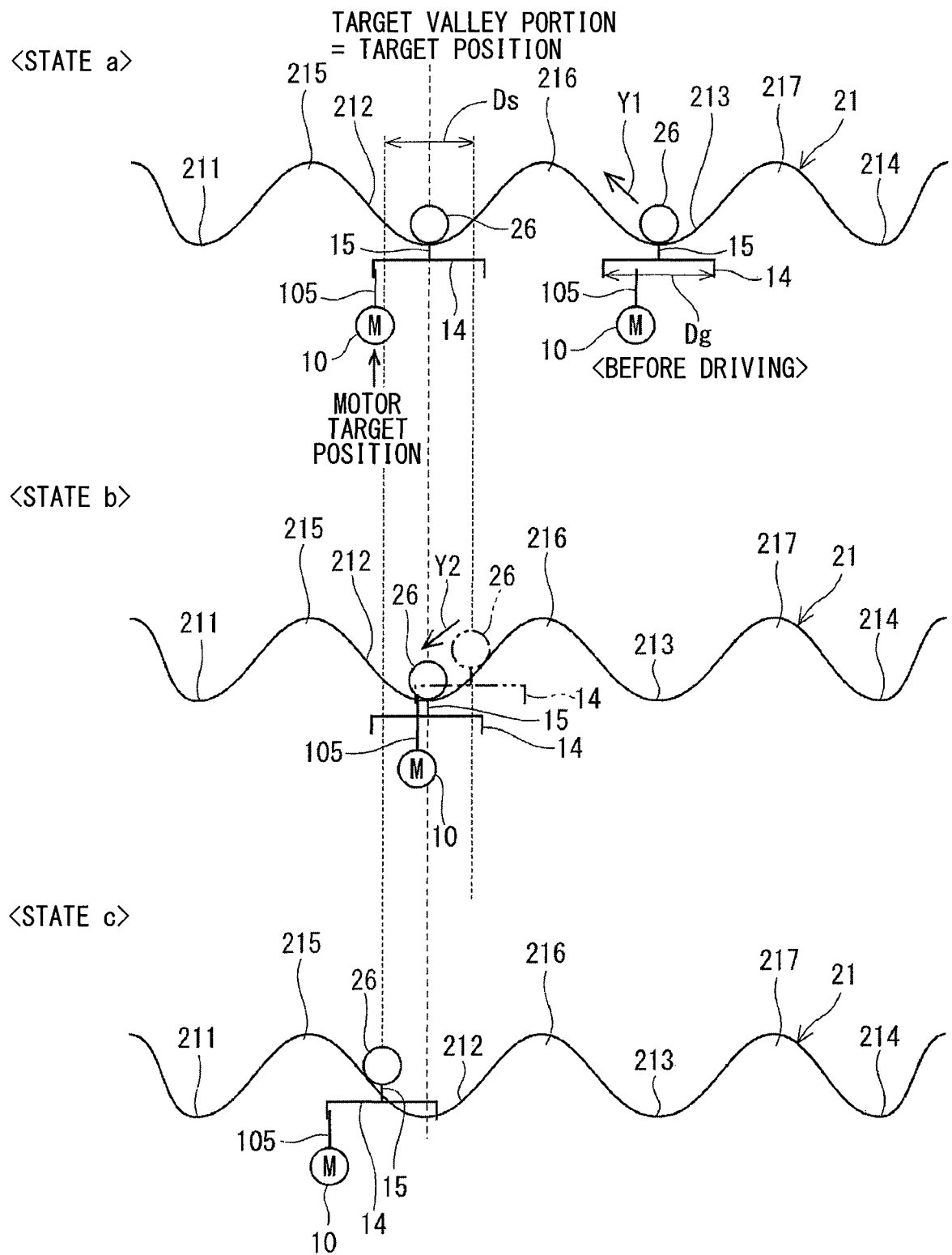
FIG. 6 is an explanatory view for explaining a behavior of a detent roller according to an exemplified example.
Figure 7:
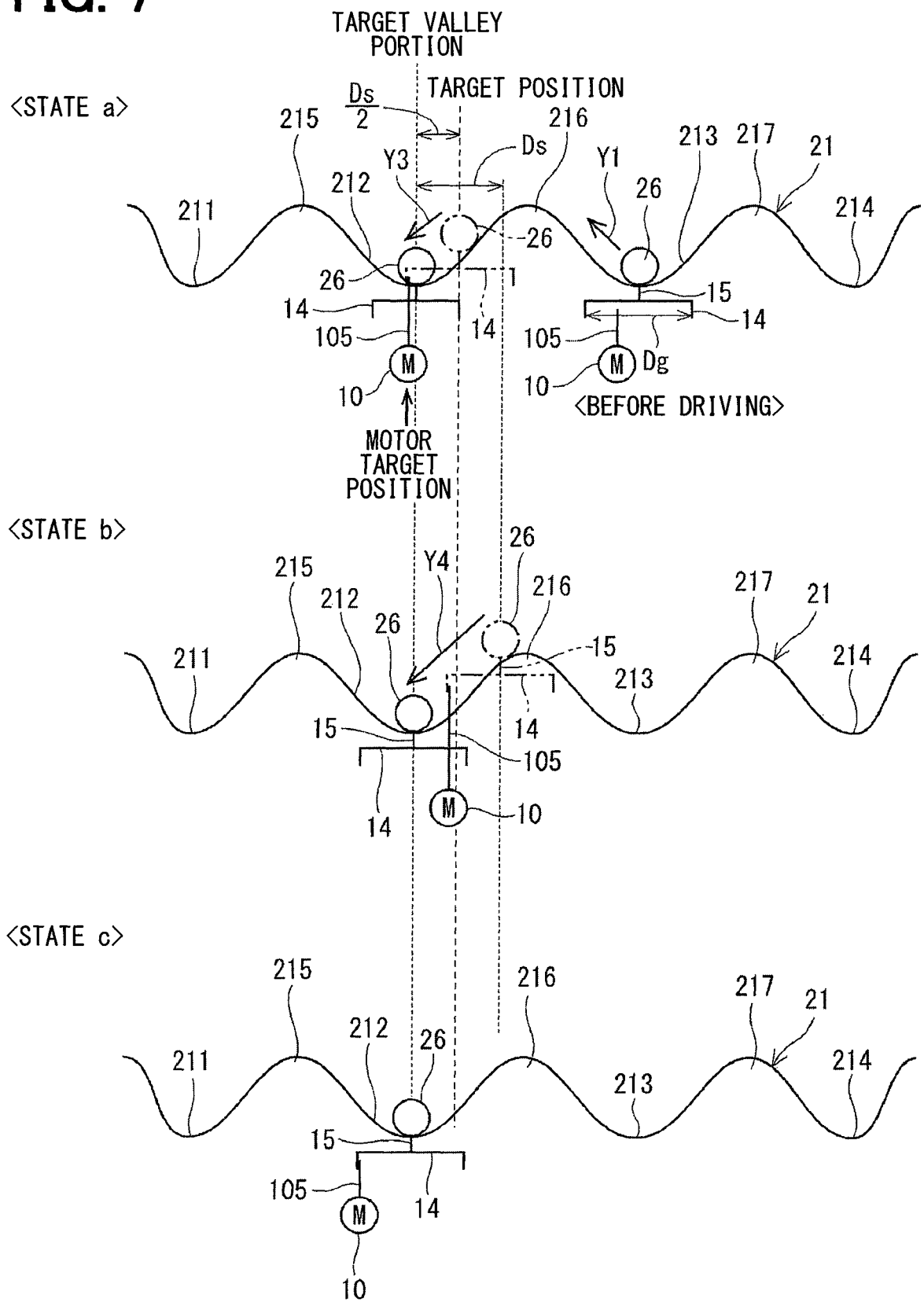
FIG. 7 is an explanatory view for explaining a behavior of a detent roller according to the first embodiment.

Setting of the target count value will be described with reference to FIGS. 6 and 7. FIGS. 6 and 7 are schematic views conceptually showing the relationship between the motor shaft 105, which is a rotary shaft of the motor 10, the output shaft 15, the detent plate 21, and the detent roller 26. Explanation will be made supposing that the rotational direction of the motor 10 is the lateral direction on the page. As described above, in the actual structure, the motor 10 actuates to rotate the output shaft 15 and the detent plate 21 thereby to move the detent roller 26. Herein, in order to simplify the explanation, the explanation will be made supposing that the detent roller 26 is moved by driving of the motor 10.

As shown in FIGS. 6 and 7, the speed reducer 14 is provided between the motor shaft 105 and the output shaft 15. Play arises due to gear backlash between the motor shaft 105 and the output shaft 15, spline fitting, which is to connect the output shaft 15 with the output shaft 15, and the like. In the present embodiment, the sum of the play between the motor shaft 105 and the output shaft 15 is larger than a position control width Ds of the detent roller 26. For example, when the motor 10 is controlled to position the detent roller 26 at ±2° relative to the target position, the position control width Ds is 4°, and the sum of the play between the motor shaft 105 and the output shaft 15 is made to be larger than 4°. Hereinafter, the sum of the play between the motor shaft 105 and the output shaft 15 is simply referred to as play Dg. In FIGS. 6 and 7, the gear backlash of the speed reducer 14 is shown as the play Dg. In FIGS. 6 and 7, illustration is made on assumption that the output shaft 15 and the speed reducer 14 are integrated with each other and that the motor shaft 105 is movable within the play of the speed reducer 14. However, a configuration may be employable where the motor shaft 105 and the speed reducer 14 are integrated with each other and where play arises between the speed reducer 14 and the output shaft 15. Similar concept is also applicable to FIG. 9 which will be described later.

In FIGS. 6 and 7, an example, in which the detent roller 26 is moved from the valley portion 213 to the valley portion 212 as shown by the arrow Y1 in order to switch the shift range from the N range to the R range, will be described as an example. That is, in this example, the valley portion 212 is a target valley portion. Further, the motor 10 is supposed to move (rotate) in the left on the page. The ECU 50 controls the motor 10 to stop at the motor target position. The stop position of the motor 10 deviates from the motor stop position within a range of a control error due to various errors and the like. In FIG. 6 and FIG. 7, <state a> shows an example, in which the motor 10 stops at the motor target position, <state b> shows an example, in which the motor 10 stops before the motor target position in the driving direction, and <state c> shows an example, in which the motor 10 stops beyond the motor target position.

As shown in <state a> in FIG. 6, in a state where the motor 10 and the output shaft 15 are integrally rotates, the rotational position of the motor 10 when the detent roller 26 reaches the target position is referred to as a motor target position. The motor 10 is controlled to stop within the range of the control error including the motor target position. In this way, the detent roller 26 is controlled to be within a range of the position control width Ds including the target position. In the present embodiment, a value obtained by converting the motor target position into an encoder count value is a target count value TCen.

FIG. 6 shows an example to drive the motor 10 by setting the center of the target valley portion as the target position of the detent roller 26. As shown in <state a> in FIG. 6, when the motor 10 stops at the motor target position, the detent roller 26 stops at the center of the target valley. As shown in <state b> in FIG. 6, when the motor 10 stops before the motor target position in the driving direction, the detent roller 26 is located before the target position. The play Dg is larger than the position control width Ds. Therefore, as shown by the arrow Y2, the output shaft 15 and the detent plate 21 rotate within the range of the play Dg by application of resilience of the detent spring 25. Thus, the detent roller 26 moves to the center of the valley portion 212 and stops.

At this time, the motor shaft 105 and the speed reducer 14 are decoupled from each other. In <state b> in FIG. 6, the detent roller 26 and the like when the motor stops are indicated by two-dot chain lines, and the detent roller 26 and the like after moving by application of the resilience of the detent spring 25 are indicated by solid lines. The same applies to <state a> and <state b> in FIG. 7.

<state c> in FIG. 6 shows a case where the motor 10 stops at a position beyond the motor target position. In the present embodiment, the motor 10 is a DC brushless motor. Therefore, a cogging torque is generated. At this time, in a case where the cogging torque is larger than the resilience of the detent spring 25, the detent roller 26 may not fall onto the center of the target valley portion, and the detent roller 26 may stop at a position deviated from the center of the target valley portion. In a case where the detent roller 26 stops at a position deviated from the center of the target valley portion, the position of the manual valve 28 may be deviated, and the oil passage related to the shift hydraulic pressure control may not be properly switched.

Therefore, in the present embodiment, as shown in FIG. 7, the target position of the detent roller 26 is set at a position before the center of the target valley portion in the driving direction, that is, on the right side on the page, and the motor target position of the motor 10 is set such that the detent roller 26 is at the target position. That is, the target position of the detent roller 26 is shifted to the position before the center of the target valley in the driving direction. A shift amount from the target valley portion is determined according to the position control width Ds. In the present embodiment, the shift amount is set to a value half of the position control width Ds. That is, the shift amount is set to Ds/2.

In the present embodiment, the play Dg is formed larger than the position control width Ds. Therefore, as shown in <state a> and <state b> in FIG. 7, the motor 10 stops while the detent roller 26 is before the center of the target valley portion in the driving direction and is within the control error range. In those cases, as indicated by the arrows Y3 and Y4, similarly to the case described in <state b> in FIG. 6, while the motor 10 stops, the output shaft 15 and the detent plate 21 rotate by application of the resilience of the detent spring 25 within the range of the play Dg, and the detent roller 26 falls onto the center of the valley portion 212.

In addition, in the present embodiment, the shift amount of the detent roller 26 from the center of the target valley portion of the target position is set to Ds/2. Therefore, as shown in <state c> in FIG. 7, when the motor 10 stops at a position, which is most advanced in the drive direction and is within the control error range, the detent roller 26 stops at the center of the target valley portion. Therefore, control of the motor 10 to locate the detent roller 26 before the center of the target valley portion in the driving direction enables to fit the detent roller 26 onto the center of the target valley portion, even when the motor 10 stops at any position within the control error range.

Figure 8:
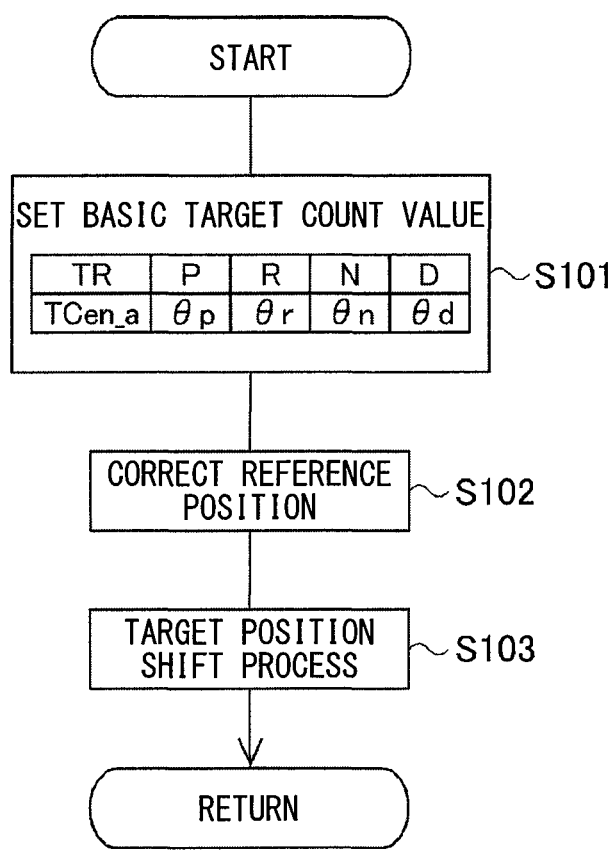
FIG. 8 is a flowchart showing a target count setting process according to the first embodiment.

The target count setting process according to the present embodiment will be described with reference to the flowchart shown in FIG. 8. The present process is a executed by the target count setting unit 53. Hereinafter, "step" in step S101 is omitted, and is simply referred to as a symbol "S." The same applies to the other steps.

In S101, the target count setting unit 53 sets a basic target count value TCen_a according to the target shift range. The basic target count value TCen_a is set to θp, when the target shift range is the P range, is set to θr, when the target shift range is the R range, is set to θn, when the target shift range is the N range, and is set to θd, when the target shift range is the D range, depending on the shape of the detent plate 21 or the like, as stored in a map or the like. θp, θr, θn, θd are expressed by Equations (1) to (4). In the Equation, θ1 is an angle between the center of the wall portion 218 and the center of the valley portion 211, and θ2 to θ4 are angles each formed between centers of adjacent valley portions (see FIG. 5).

$$\theta p = \theta 1 \tag{1}$$

$$\theta r = \theta 1 + \theta 2 \tag{2}$$

$$\theta n = \theta 1 + \theta 2 + \theta 3 \tag{3}$$

$$\theta d = \theta 1 + \theta 2 + \theta 3 + \theta 4 \tag{4}$$

Herein, θp, θr, θn, θd are explained as angles in the detent plate 21. It is noted that, the basic target count value TCen_a set in S101 is a value converted into an encoder count value according to the gear ratio of the speed reducer 14 and a count width of the encoder 13.

In S102, the target count setting unit 53 performs a reference position correction process by using a correction value Cx, which is learned in the wall butting control, and calculates a corrected target count value TCen_b. The corrected target count value TCen_b is expressed by Equation (5). It is noted that, in a case where the motor 10 is controlled without performing learning in the wall butting control, the process in this step may be omitted.

$$\text{TCen\_b} = \text{TCen\_a} + Cx \tag{5}$$

In S103, the target count setting unit 53 performs a target position shift process to shift the target position of the detent roller 26 from the center of the target valley portion and calculates the target count value TCen. The target count value TCen is calculated with Equation (6-1) or Equation (6-2). The shift value Cy is a predetermined value set according to the position control width Ds. The shift value Cy of the present embodiment is a value obtained by converting a value half of the position control width Ds, (that is, Ds/2) into an encoder count value.

$$\text{TCen} = \text{TCen\_b} + Cy \tag{6-1}$$

$$\text{TCen} = \text{TCen\_b} - Cy \tag{6-2}$$

Equation (6-1) is an Equation for driving the motor 10 in the forward direction, that is, for moving the detent roller 26 toward D. Equation (6-2) is an Equation for driving the motor 10 in the reverse direction, that is, for moving the detent roller 26 toward P. That is, in the present embodiment, when the rotational direction of the motor 10 is the forward direction, the shift value Cy is subtracted, and when the rotational direction is the reverse direction, the shift value Cy is added. In this way, the motor 10 is stopped before the position in the driving direction.

In this way, the motor 10 is controlled to locate the detent roller 26 before the center of the target valley in the drive direction, thereby to enable to fit the detent roller 26 onto the center of the target valley portion even when the motor 10 stops at any position within the control error range including the motor target position.

As described above, the shift-by-wire system 1 includes the motor 10, the output shaft 15, the detent plate 21, the detent roller 26, and the ECU 50. The driving force of the motor 10 is transmitted to the output shaft 15. The motor shaft 105, which is the rotary shaft of the motor 10, and the output shaft 15 form a play Dg therebetween. The detent plate 21 has the valley portions 211 to 214 correspondingly to the shift ranges and rotates integrally with the output shaft 15. The detent roller 26 is biased in the direction to be fitted to the valley portions 211 to 214 by the resilience of the detent spring 25 and is fitted onto the target valley portion, which is of the valley portions 211 to 214, corresponding to the target shift range.

The ECU 50 controls driving of the motor 10. The ECU 50 determines the motor target position to locate the detent roller 26 at a position shifted before the center of the target valley portion by a predetermined amount in the driving direction. In the present embodiment, ½ of the position control width Ds of the detent roller 26 is the predetermined amount.

In the present embodiment, the motor 10 is controlled to locate the detent roller 26 before the center position of the target valley in the driving direction. In this way, even in a case where a motor, such as a DC motor which generates a cogging torque, is employed as the motor 10, the detent roller 26 is enabled to be fitted onto the center of the target valley portion by resilience of the detent spring 25, after the motor 10 stops. Therefore, the configuration enables to switch the shift range appropriately to enable to normally perform the hydraulic pressure control for manipulating the shift range.

The play Dg between the motor shaft 105 and the output shaft 15 is larger than the position control width Ds of the detent roller 26 which corresponds to the control error caused in the drive control of the motor 10. The configuration enables to move the output shaft 15 within the range of the play Dg when the motor 10 stops, thereby to enable the detent roller 26 to be reliably fitted onto the center of the target valley portion.

Second Embodiment

A second embodiment will be described with reference to FIGS. 9 to 12. The present embodiment is different from the embodiments described above in the motor control process, and therefore, explanation will be made mainly on this issue. As described in <state c> in FIG. 6, when the motor 10 stops at the position where the detent roller 26 is beyond the center of the target valley portion, the detent roller 26 may stop at a position deviated from the center of the target valley portion without falling onto the center of the target valley portion, due to influence of the cogging torque.

Figure 9:
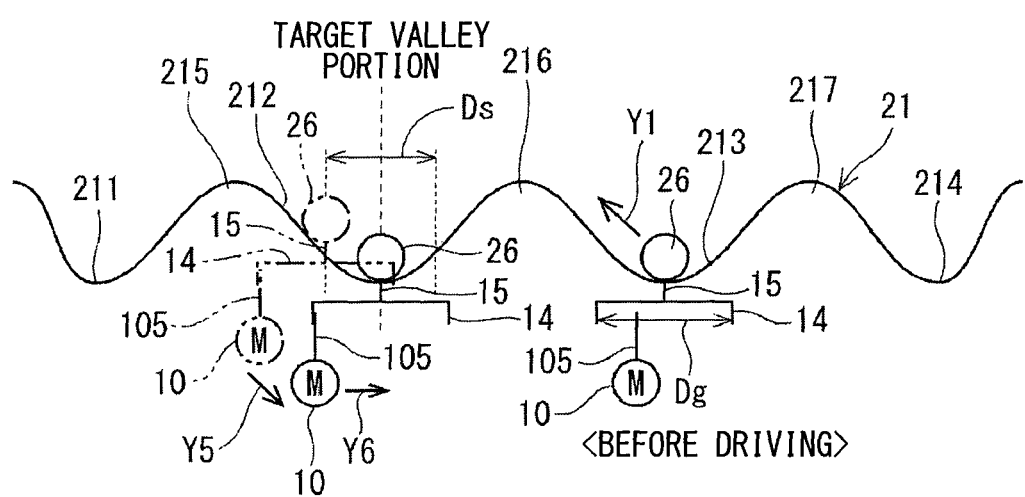
FIG. 9 is an explanatory view for explaining a behavior of a detent roller according to a second embodiment.

Therefore, as shown in FIG. 9, the target position of the detent roller 26 is first set to the center of the target valley portion. In addition, the motor target position is set such that the detent roller 26 is to be located at the center of the target valley portion, and the motor 10 is driven. The target position of the detent roller 26, which is currently set, may be deviated from the center of the target valley. Subsequently, after the motor 10 stops within the control error range including the motor target position, as shown by the arrow Y5, the motor 10 is driven in a direction opposite to the direction before its stoppage. In this way, the detent roller 26 is moved to the center of the valley portion 212 by application of resilience of the detent spring 25. Hereinafter, the control to drive the motor 10 in the direction, which is opposite to the direction before the stoppage of the motor 10, is referred to as a reverse control.

Figure 10:
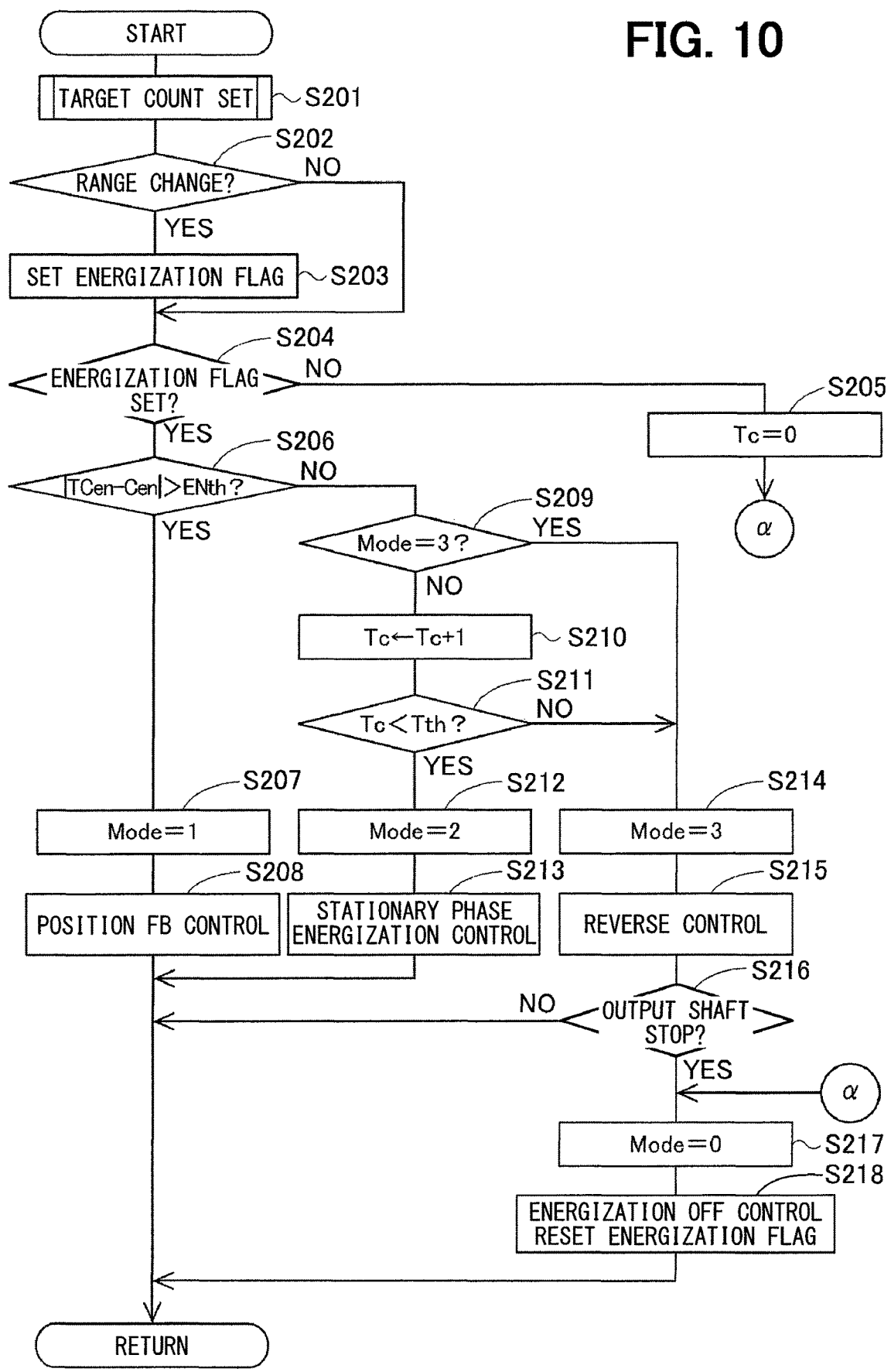
FIG. 10 is a flowchart explaining a motor control process according to the second embodiment.

FIG. 10 shows the motor control process according to the present embodiment. The present process is executed by the ECU 50 at a predetermined cycle. A control the mode is defined before explanation of the motor control process. In the present embodiment, the mode 0 is an energization OFF control, the mode 1 is a position feedback control, the mode 2 is a stationary phase energization control, and the mode 3 is the reverse control. In S201, the target count setting unit 53 executes a target count setting process for setting the target count value TCen.

Figure 11:
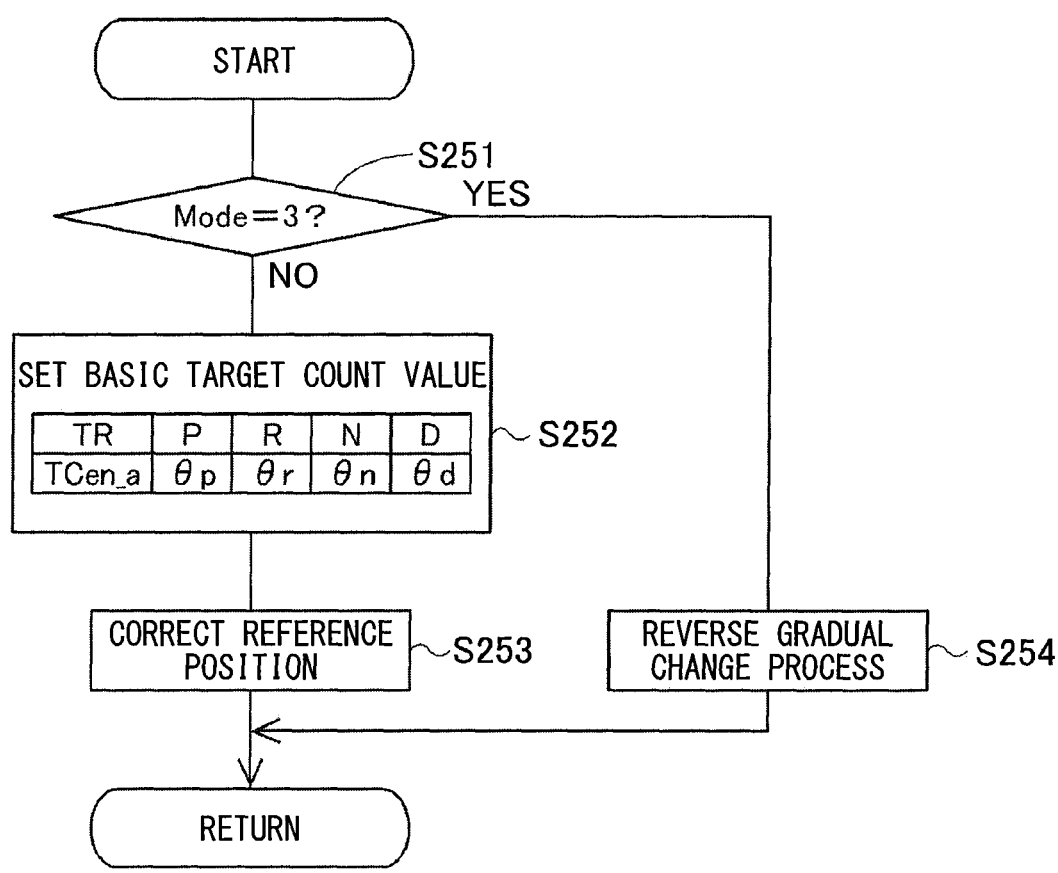
FIG. 11 is a flowchart showing a target count setting process according to the second embodiment.

FIG. 11 is a sub-flow showing the target count setting process. In S251, the target count setting unit 53 determines whether the control the mode is the mode 3. Determination is made whether the control the mode is the mode 3 or not. When it is determined that the control the mode is the mode 3 (S251: YES), the process proceeds to S254. When it is determined that the control the mode is other than the mode 3 (S251: NO), the process proceeds to S252. The processes in S252 and S253 is similar to the processes in S101 and S102 in FIG. 8. Similarly to S102, S253 may be omitted in a case where the learning by performing the wall butting control is not implemented.

When the control the mode is the mode 3 (S251: YES), that is, when the motor 10 is controlled with the reverse control, the target count setting unit 53 performs a reverse gradual change process to calculate the target count value TCen. The target count value TCen is calculated with Equation (6-1) or Equation (6-2). In the present embodiment, a reverse processing amount Cr is set to a value corresponding to the motor resolution. TCen (n−1) in the Equation is a previous value of the target count value TCen.

$$TCen = TCen(n-1) + Cr \tag{7-1}$$

$$TCen = TCen(n-1) - Cr \tag{7-2}$$

Equation (7-1) is an Equation used when the motor 10 is driven in the forward direction by the position feedback control, that is, when the detent roller 26 is moved in the D direction. Equation (7-2) is an Equation used when the motor 10 is driven in the reverse direction by the position feedback control, that is, when the detent roller 26 is moved in the P direction.

Returning back to FIG. 10, the process proceeds subsequent to the target count setting process to S202. In S202, the ECU 50 determines whether the target shift range is changed. When it is determined that the target shift range is not changed (S202: NO), the process proceeds to S204. When it is determined that the target shift range is changed (S202: YES), the process proceeds to S203. In S203, the ECU 50 sets an energization flag of the motor 10. The switching control unit 65 may execute the set and reset process of the energization flag. Alternatively, a different element other than the switching control unit 65 may execute the set and reset process.

In S204, the switching control unit 65 determines whether the energization flag is set. When it is determined that the energization flag is set (S204: YES), the process proceeds to S206. When it is determined that the current supply flag is reset (S204: NO), the process proceeds to S205. In S205, the switching control unit 65 resets a timer value Tc, which will be described later, and proceeds to S217.

When it is determined that the energization flag is set (S204: YES), the process proceeds to S206. In S206, the switching control unit 65 determines whether an absolute value of a difference between the target count value TCen and the actual count value Cen is larger than an angle determination threshold ENth. According to the present embodiment, the absolute value of the difference between the target count value TCen and the actual count value Cen corresponds to a deviation value between the target angle and the actual angle. The angle determination threshold ENth is set to a predetermined value close to 0, such as a count value corresponding to 0.5 degrees in mechanical angle. When it is determined that the absolute value of the difference between the target count value TCen and the actual count value Cen is less than or equal to the angle determination threshold ENth (S206: NO), the process proceeds to S209. When it is determined that the absolute value of the difference between the target count value TCen and the actual count value Cen is larger than the angle determination threshold ENth (S206: YES), the process proceeds to S207.

In S207, the switching control unit 65 sets the control the mode to the mode 1. In S208, the ECU 50 performs the position feedback control to control driving of the motor 10.

When it is determined that the absolute value of the difference between the target count value TCen and the actual count value Cen is equal to or less than the angle determination threshold ENth (S206: NO), the process proceeds to S209. In S209, the switching control unit 65 determines whether the current control the mode is the mode 3. When it is determined that the current control the mode is the mode 3 (S209: YES), that is, when the reverse control is in progress, the process proceeds to S214. When it is determined that the current control the mode is other than the mode 3 (S209: NO), the process proceeds to S210.

In S210, the switching control unit 65 increments a timer value Tc, which is the count value of a timer that measures the duration of the stationary phase energization control. In S211, the switching control unit 65 determines whether the timer value Tc is less than a duration determination threshold Tth. The duration determination threshold Tth is set according to an energization duration Ta for which the stationary phase energization control is continued. The energization duration Ta is, for example, 100 ms. When it is determined that the timer value Tc is larger than or equal to the duration determination threshold Tth, the process proceeds to S110. When it is determined that the timer value Tc is less than the duration determination threshold Tth (S211: YES), the process proceeds to S212. In S212, the switching control unit 65 sets the control the mode to the mode 2. In S213, the ECU 50 performs the stationary phase energization control to control driving of the motor 10.

When it is determined that the control the mode is the mode 3 (S209: YES) or when it is determined that the timer value Tc is larger than or equal to the duration determination threshold Tth (S211: NO), the process proceeds to S214. In S214 the switching control unit 65 sets the control the mode to the mode 3. In S215, the ECU 50 performs the reverse control to drive the motor 10 in the driving direction which is opposite to that before the motor 10 is stopped in the stationary phase energization control. In the present embodiment, the motor 10 is reversely driven by a feedback control.

In S216, the switching control unit 65 determines whether the output shaft 15 has stopped. In the present embodiment, when a state, in which the detection value can be regarded as unchanged based on the detection value of the output shaft sensor 16, continues for a predetermined delay time Td, such as 50 ms, it is determined that the output shaft 15 has stopped. When it is determined that the output shaft 15 has not stopped (S216: NO), the reverse control is continued. When it is determined that the output shaft 15 has stopped (S216: YES), the process proceeds to S217.

When an affirmative determination is made in S216 or subsequent to S205, the process proceeds to S217. In S217, the switching control unit 65 sets the control the mode to the mode 0. In S218, the ECU 50 performs the energization off control to turn off all the switching elements 411 to 416 and 421 to 426. Further, the switching control unit 65 resets the energization flag. When the energization flag is reset, the OFF state is continued. As a supplement, in the motor control process according to the first embodiment, the process in FIG. 8 is performed as the target count setting process, and the processes in S209 and S214 to S216 are omitted.

Figure 12:
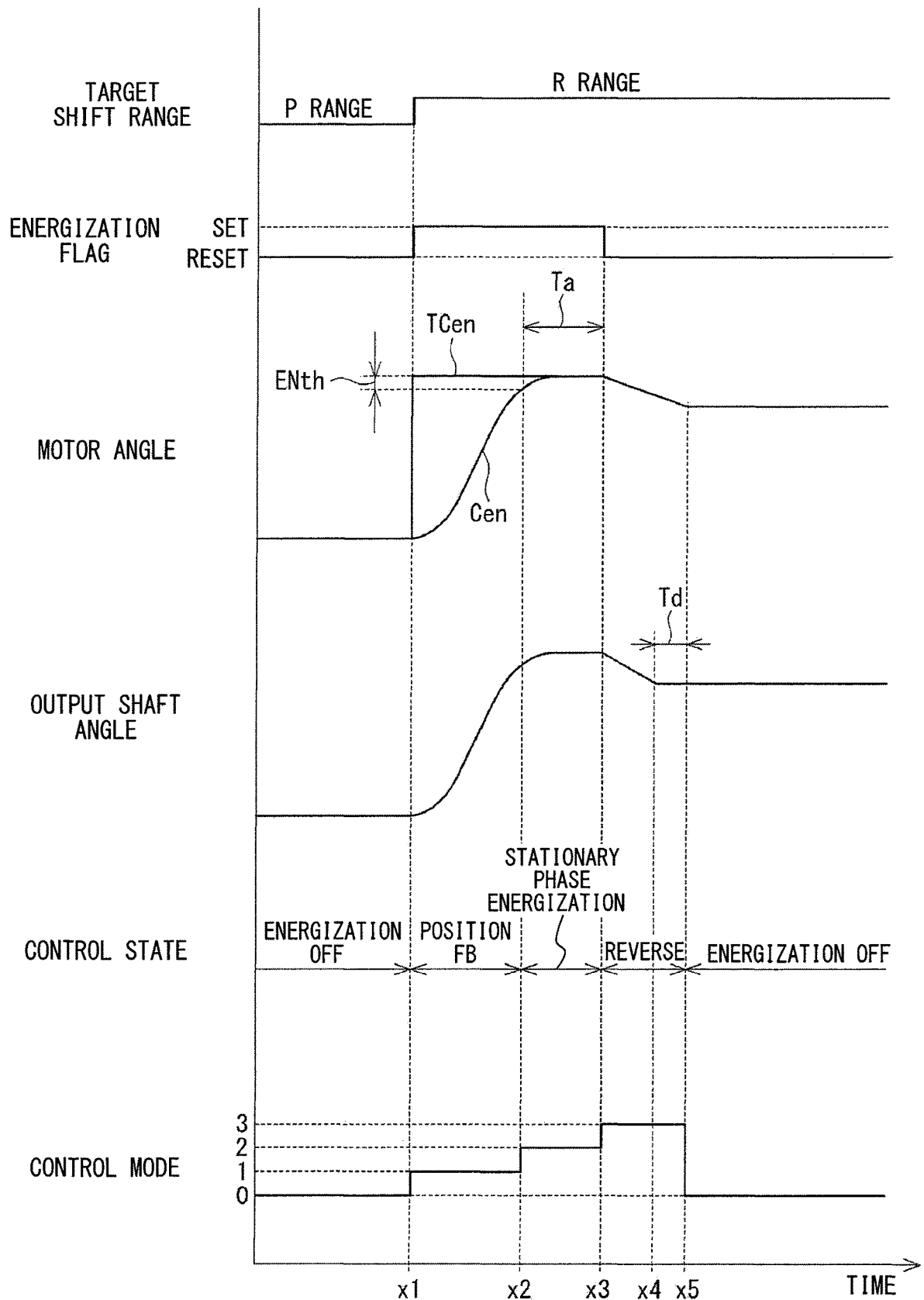
FIG. 12 is a timechart for explaining a motor control process according to the second embodiment.

The motor control process according to the present embodiment will be explained with reference to a time chart shown in FIG. 12. Herein, it is supposed that the motor 10 is driven in the forward direction, and an example, in which the P range is switched to the R range, will be described. FIG. 12 shows the target shift range, the energization flag, the angle of the motor 10, the output shaft angle, the control state of the motor 10, and the control the mode in this order from the top with a common time axis on the horizontal axis. In FIG. 12, the angle of the motor 10 is represented by the count value of the encoder 13.

As shown in FIG. 12, when the target shift range is maintained in the same range (P range in the example of FIG. 12) before the time x1, the control the mode is the mode 0, and the control state of the motor 10 is the energization off control. When the target shift range is switched at the time x1, the energization flag being reset is set. The switching control unit 65 sets the control the mode to the mode 1 and switches the control state of the motor 10 from energization off control to the position feedback control. Further, the target count value TCen is set according to the target shift range. The ECU 50 performs the position feedback control to control the motor 10, thereby to cause the actual count value Cen to approach the target count value TCen. In the present embodiment, the phase advance value Cen_pl, which is subjected to the phase advance filter process, is fed back, thereby to enhance the response. When the motor 10 rotates, the output shaft 15 rotates accordingly.

At the time x2, when the difference between the target count value TCen and the actual count value Cen becomes smaller than or equal to the angle determination threshold ENth, the control the mode is set to the mode 2, and the control state of the motor 10 is switched to the stationary phase energization control. The stationary phase energization enables the motor 10 to stop promptly. At this time, the output shaft 15 also stops. The stationary phase energization control is continued in a period from the beginning of the stationary phase energization control to the time x3 at which the energization duration Ta elapses. At this time, when the motor 10 is stopped at a position, which is within the range of the control error and is beyond the target count value TCen, the motor 10, the output shaft 15, and the detent roller 26 are shifted to the state shown by the two-dot chain lines in FIG. 9.

At the time x3 after the energization continuation time Ta has elapsed, the switching control unit 65 sets the control the mode to the mode 3 and switches the control state of the motor 10 from the stationary phase energization control to the reverse control. In the present embodiment, the target count value TCen is shifted by the resolution of the motor 10, thereby to gradually rotate the motor 10 in the direction opposite to that during the position feedback control. That is, in the present embodiment, the motor 10 is reversely driven gradually in the reverse control. The period from the time x3 to the time x5 has been described supposing that, the motor 10 is gradually rotated, and the target count value TCen and the actual count value Cen substantially coincide with each other.

In the present embodiment, the motor 10 is reversely driven gradually after the energization duration Ta elapses. Therefore, as shown by the arrow Y5 in FIG. 9, the detent roller 26 is rotated by resilience of the detent spring 25 and is moved toward the center of the target valley portion as the motor 10 rotates. Further, as shown by the solid line in FIG. 9, the detent roller 26 stops at the center of the target valley when reaching the center of the target valley. When the detent roller 26 stops at the center of the target valley, the motor 10 rotates within the range of the play Dg, as shown by the arrow Y6, and the output shaft 15 and the detent plate 21 do not rotate.

Therefore, in the present embodiment, the rotation state of the output shaft 15 is determined based on the detection value of the output shaft sensor 16. Further, when the rotation of the output shaft 15 stops, it is regarded that the detent roller 26 has fallen onto the center of the target valley portion. In the present embodiment, it is supposed that the output shaft 15 has stopped at the time x5, at which the predetermined delay time Td has elapsed from the time x4 and at which the detection value of the output shaft sensor becomes constant. Thus, the control the mode is set to the mode 0, and the control state of the motor 10 is switched to the energization off control.

In the present embodiment, the play Dg is defined to be larger than the position control width Ds. Therefore, even when the motor 10 is reversely driven from the state where the detent roller 26 is stopped on the front side of the center of the target valley portion, the motor 10 rotates within the range of the play Dg. Therefore, the detent roller 26 falls onto the center of the target valley portion by the resilience of the detent spring 25 without disturbance of drive of the detent roller 26. In the present embodiment, the stationary phase energization control is performed, and the motor 10 is stopped. Subsequently, the reverse control is performed to drive the motor 10 in the opposite direction, thereby to enable the detent roller 26 to be reliably fitted onto the center of the target valley portion.

In the present embodiment, after the motor 10 stops within the range of the control error including the motor target position, the ECU 50 performs the reverse control to drive the motor 10 in the direction opposite to the rotational direction before the motor 10 stops.

In the present embodiment, the motor 10 is controlled to stop thereby to locate the detent roller 26 at the center position of the target valley portion. Subsequently, the reverse control is performed to drive the motor 10 in the opposite direction. In this way, even in a case where a motor, such as a DC motor which generates a cogging torque, is employed as the motor 10, the detent roller 26 is enabled to be fitted onto the center of the target valley portion by resilience of the detent spring 25. Therefore, the configuration enables to switch the shift range appropriately to enable to normally perform the hydraulic pressure control for manipulating the shift range.

The shift-by-wire system 1 includes the output shaft sensor 16 to detect rotation of the output shaft 15. When it is determined that the output shaft 15 has stopped based on the detection value of the output shaft sensor 16, the ECU 50 terminates the reverse control. In this way, the configuration enables to terminate the reverse control after the detent roller 26 stops at the center of the target valley portion. Thus, effects similarly to those of the embodiments described above will be produced.

Other Embodiments

According to the embodiments described above, the motor is a permanent magnet type three phase brushless motor. According to another embodiment, the motor is not limited to a permanent magnet type three phase brushless motor and may employ various motors. According to the embodiments described above, two sets of windings are provided in the motor. According to another embodiment, the number of sets of windings in the motor may be one or may be three or more.

According to the embodiments described above, the rectangular wave control with 120° energization is performed in the position feedback control. According to another embodiment, a rectangular wave control with 180° energization may be performed in the position feedback control. A PWM control with triangle wave comparison or with instantaneous vector selection may be employable alternatively to the rectangular wave control.

According to the embodiments described above, the motor control the mode is switched between the position feedback control and the stationary phase energization control. According to other embodiments, the motor control unit may set at least one of the position feedback control and the stationary phase energization control to a different control state. According to the embodiments described above, the position feedback control and the stationary phase energization control are switched. According to another embodiment, a singular control state, such as the position feedback control may be employable to control driving of the motor without switching the control state of the motor. The method for motor control may be modified according to the type of the motor as used.

In the second embodiment, the motor target position is shifted by the reverse processing amount corresponding to the motor resolution in the reverse control, and the feedback control is performed to reversely drive the motor. According to another embodiment, a case where, for example, wall butting learning is performed to learn the range of play is assumed. In this case, a motor target position may be determined at a position shifted from a motor target position before the motor is stopped by a predetermined amount, such as a half of the play amount, in the driving direction. Further, a feedback-control may be performed by using the motor target position to reversely drive the motor target. In this way, the control can be simplified. Further, according to another embodiment, the stationary phase energization control may be performed to switch the energized phase in the form of, for example, UV→VW→WU thereby to reversely drive the motor. In addition, various methods may be employable as a control method to reversely drive the motor.

According to the embodiments described above, the encoder is employed as the rotational angle sensor to detect the motor angle of the motor. According to another embodiment, various other devices, such as a resolver, may be employable as the rotational angle sensor alternatively to the encoder. According to the embodiments described above, the count value of the encoder is subjected to the phase advance filter process and is used in the position feedback control. According to the other embodiments, the phase advance filter may be omitted, and the position feedback control may be performed by using the rotational angle of the motor itself or by using a value, which is other than the encoder count value and is convertible into the rotational angle of the motor. Similar rule is applicable to selection of the stationary phase in the stationary phase energization control. According to another embodiment, the phase advance filter process may be omitted. According to the embodiment described above, the wall butting control is performed to correct the encoder count value. In another embodiment, the wall butting control may be omitted. The output shaft sensor may employ a device other than the potentiometer. The output shaft sensor may be omitted.

According to the embodiments described above, the four recess portions are formed in the detent plate. According to another embodiment, the number of the recess portions is not limited to four and may be another number. For example, a configuration may be employable where the number of the recess portions of the detent plate is two and where the P range and the not P range are switchable therebetween. The shift range switching mechanism and the parking lock mechanism or the like may be different from those in the embodiments described above. Further, in the embodiments described above, the shift range switching device employs a shift-by-wire system. According to another embodiment, the shift range switching device may employ a configuration other than the by-wire system.

According to the embodiments described above, the speed reducer is provided between the motor shaft of the motor and the output shaft. According to another embodiment, the speed reducer between the motor shaft of the motor and the output shaft may be omitted, and a mechanism other than the reducer may be provided. That is, according to the embodiments described above, a configuration, in which the play between the motor shaft and the output shaft resides between the output shaft and the gears of the speed reducer, has been described. It is noted that, the play may be regarded as a sum of play, rattle, or the like, residing between the motor shaft and the output shaft. The present disclosure is not limited to the embodiments described above, and various modifications are employable within the scope of the present disclosure without departing from the spirit of the invention.

The present disclosure has been described with embodiments. However, the present disclosure is not limited to the embodiments and the configurations. The present disclosure also encompasses various modifications and variations within the scope of equivalents. Furthermore, other combinations and other forms including various combinations and various forms of only one element, or more, or less, are also within the scope and spirit of the present disclosure.

The invention claimed is:

1. A shift range switching device comprising:
a motor;
an output shaft configured to receive transmission of a driving force of the motor;
a valley forming member having valley portions corresponding to shift ranges and configured to rotate integrally with the output shaft;
an engaging member biased with a biasing member in a direction to be fitted to a valley portion and configured to be fitted to a target valley portion, which is a valley portion corresponding to a target shift range; and
a motor control unit configured to perform a control to drive the motor, wherein
a motor shaft, which is a rotary shaft of the motor, and the output shaft have a play therebetween, and
the motor control unit is configured
to determine a motor target position to locate the engaging member at a position shifted by half of a position control width before a center of the target valley portion in a driving direction; and
to perform a control to drive the motor to cause the engaging member to stop at the center of the target valley portion when the motor stops at a position, which is most advanced in the driving direction and is within a control error range.

2. The shift range switching device according to claim 1, wherein
the play is larger than the position control width of the engagement member which corresponds to the control error caused in the control to drive the motor.

3. A shift range switching device comprising:
a motor;
an output shaft configured to receive transmission of a driving force of the motor;
a valley forming member having valley portions corresponding to shift ranges and configured to rotate integrally with the output shaft;
an engaging member biased with a biasing member in a direction to be fitted to a valley portion and configured to be fitted to a target valley portion, which is a valley portion corresponding to a target shift range; and
a motor control unit configured to perform a control to drive the motor, wherein
a motor shaft, which is a rotary shaft of the motor, and the output shaft have a play therebetween, and
the motor control unit is configured, after the motor stops within a range of a control error including a motor target position, to perform a reverse control to drive the motor in a direction, which is opposite to a rotational direction before the motor stops,
the motor control unit is further configured,
to set the motor target position to locate the engaging member at a center of the target valley portion,
to continue a stationary phase energization control for an energization duration and to stop the motor and subsequently to switch to the reverse control.

4. The shift range switching device according to claim 3, further comprising:
an output shaft sensor configured to detect a rotational angle of the output shaft, wherein
the motor control unit is configured to terminate the reverse control on determination that the output shaft stops based on a detection value of the output shaft sensor.

5. The shift range switching device according to claim 3, wherein
the play is larger than a position control width of the engagement member which corresponds to the control error caused in the control to drive the motor.

* * * * *